United States Patent
Gould

(10) Patent No.: US 8,388,124 B2
(45) Date of Patent: Mar. 5, 2013

(54) PRINTING INK

(75) Inventor: Nigel Gould, Broadstairs (GB)

(73) Assignee: Sericol Limited, Kent (GB)

( * ) Notice: Subject to any disclaimer, the term of this patent is extended or adjusted under 35 U.S.C. 154(b) by 338 days.

(21) Appl. No.: 12/524,920

(22) PCT Filed: Jan. 29, 2008

(86) PCT No.: PCT/GB2008/000298
§ 371 (c)(1), (2), (4) Date: Mar. 12, 2010

(87) PCT Pub. No.: WO2008/093071
PCT Pub. Date: Aug. 7, 2008

(65) Prior Publication Data
US 2010/0227127 A1    Sep. 9, 2010

(30) Foreign Application Priority Data

Jan. 29, 2007 (GB) .................................. 0701660.3
Mar. 20, 2007 (GB) .................................. 0705323.4

(51) Int. Cl.
  *B05D 3/06* (2006.01)
  *B32B 3/10* (2006.01)
(52) U.S. Cl. ............ 347/96; 522/71; 522/174; 522/186; 427/466; 427/487; 428/195.1
(58) Field of Classification Search .................... 522/71, 522/174, 186; 347/96; 427/466, 487; 428/195.1
See application file for complete search history.

(56) References Cited

U.S. PATENT DOCUMENTS 6,550,905 B1   4/2003 Deckers
2002/0086914 A1*  7/2002 Lee et al. ................. 522/75

FOREIGN PATENT DOCUMENTS

WO   02/38687 A1   5/2002
WO   03/010249 A1  2/2003
WO   03/011989 A1  2/2003

OTHER PUBLICATIONS

"UK Search Report, Patents Act 1977: Search Report under Section 17(5)", dated May 14, 2007, for GB0701660.3, 3pgs.

* cited by examiner

*Primary Examiner* — Vu A Nguyen
(74) *Attorney, Agent, or Firm* — Wood, Phillips, Katz, Clark & Mortimer

(57) ABSTRACT

The present invention relates to a radiation-curable ink-jet ink comprising at least two monofunctional (meth)acrylate monomers; a monofunctional monomer selected from an N-vinyl amide, an N-acryloyl amine, or a mixture thereof; a polymerisable (meth)acrylate oligomer; a radical photoinitiator; and a colouring agent; wherein the ink has a viscosity of less than 100 mPas at 25° C. The ink is substantially free of multifunctional monomers; and the at least two monofunctional (meth)acrylate monomers include a combination of a cyclic monofunctional (meth)acrylate monomer and an acyclic-hydrocarbon monofunctional (meth)acrylate monomer. The ink displays an excellent balance of cure speed and viscosity for the ink together with hardness and flexibility for the cured film.

19 Claims, No Drawings

PRINTING INK

This application is a U.S. National Stage filing under 35 U.S.C. §371 and 35 U.S.C §119, based on and claiming priority to PCT/GB2008/000298 for "A PRINTING INK" filed Jan. 29, 2008, claiming priorities to GB Patent Application No. 0701660.3 filed Jan. 29, 2007 and GB Patent Application No. 0705323.4 filed Mar. 20, 2007.

This invention relates to a printing ink and in particular to inks for use in ink jet printers that are cured using actinic radiation.

In ink-jet printing, minute droplets of black, white or coloured ink are ejected in a controlled manner from one or more reservoirs or printing heads through narrow nozzles on to a substrate which is moving relative to the reservoirs. The ejected ink forms an image on the substrate. For high-speed printing, the inks must flow rapidly from the printing heads, and, to ensure that this happens, they must have in use a low viscosity, typically below 100 mPas at 25° C. although in most applications the viscosity should be below 50 mPas, and often below 25 mPas. Typically, when ejected through the nozzles, the ink has a viscosity of less than 25 mPas, preferably 5-15 mPas and ideally 10.5 mPas at the jetting temperature which is often elevated to about 40° C. (the ink might have a much higher viscosity at ambient temperature). The inks must also be resistant to drying or crusting in the reservoirs or nozzles. For these reasons, ink-jet inks for application at or near ambient temperatures are commonly formulated to contain a large proportion of a mobile liquid vehicle or solvent. In one common type of ink-jet ink this liquid is water—see for example the paper by Henry R. Kang in the Journal of Imaging Science, 35 (3), pp. 179-188 (1991). In those systems, great effort must be made to ensure the inks do not dry in the head due to water evaporation. In another common type the liquid is a low-boiling solvent or mixture of solvents—see, for example, EP 0 314 403 and EP 0 424 714. Unfortunately, ink-jet inks that include a large proportion of water or solvent cannot be handled after printing until the inks have dried, either by evaporation of the solvent or its absorption into the substrate. This drying process is often slow and in many cases (for example, when printing on to a heat-sensitive substrate such as paper) cannot be accelerated.

Another type of ink jet ink contains unsaturated organic compounds, termed monomers, which polymerise by irradiation, commonly with ultraviolet light, in the presence of a photoinitiator. This type of ink has the advantage that it is not necessary to evaporate the liquid phase to dry the print; instead the print is exposed to radiation to cure or harden it, a process which is more rapid than evaporation of solvent at moderate temperatures. In such ink-jet inks it is necessary to use monomers possessing a low viscosity.

However, ink-jet inks largely based on monomers suffer from significant draw-backs compared to ink-jet inks containing solvent or more traditional inks such as screen or flexographic systems, where the higher viscosities allowed give greater formulation latitude. These types of ink can have significant amounts of the monomer content replaced with acrylate oligomers or inert thermoplastic resins whose higher molecular weight leads to a reduction in the number of bonds that must be formed during the curing process. When each link is formed the bond length between the repeat units reduces leading to shrinkage of the cured film and unless this is controlled stress is imparted to the substrate. With plastic substrates this film shrinkage can lead to severe embrittlement of the printed article and post print finishing, such as guillotining, becomes problematic.

Traditionally UV ink-jet inks are formulated with difunctional acrylate monomers in order to achieve adequate cure speeds. Inks produced from these types of materials suffer badly from film shrinkage and consequent substrate embrittlement. Theoretically it should be possible to reduce shrinkage by use of wholly monofunctional acrylate or vinyl monomer based systems, however this approach has generally been avoided due to very low cure speeds associated with monofunctional monomers.

There is therefore a requirement in the art for inks which achieve a balance between cure speed and film shrinkage without compromising the low viscosity of the ink-jet ink.

Accordingly, the present invention provides a radiation-curable ink-jet ink comprising at least two monofunctional (meth)acrylate monomers; a monofunctional monomer selected from an N-vinyl amide, an N-acryloyl amine, or a mixture thereof; a polymerisable (meth)acrylate oligomer; a radical photoinitiator; and a colouring agent; wherein the ink has a viscosity of less than 100 mPas at 25° C.; wherein the ink is substantially free of multifunctional monomers; and wherein the at least two monofunctional (meth)acrylate monomers include a combination of a cyclic monofunctional (meth)acrylate monomer and an acyclic-hydrocarbon monofunctional (meth)acrylate monomer.

The ink-jet ink of the present invention dries primarily by curing, i.e. by the polymerisation of the monomers present, as discussed hereinabove, and hence is a curable ink. The ink does not, therefore, require the presence of water or a volatile organic solvent to effect drying of the ink, although the presence of such components may be tolerated. Preferably, however, the ink-jet ink of the present invention is substantially free of water and volatile organic solvents.

As explained hereinabove incorporating significant amounts of monofunctional monomers in inks has traditionally led to very poor UV cure response and hence multifunctional monomers have had to be added to boost cure. It has now been found that combinations of certain monofunctional (meth)acrylate monomers, N-vinyl amide and/or N-acryloyl amine monomers and a polymerisable (meth)acrylate oligomer provide an excellent balance of cure speed and viscosity for the ink together with hardness and flexibility for the cured film.

N-Vinyl amides are well-known monomers in the art and a detailed description is therefore not required. N-Vinyl amides have a vinyl group attached to the nitrogen atom of an amide which may be further substituted in an analogous manner to the (meth)acrylate monomers.

Preferred examples are N-vinyl caprolactam (NVC) and N-vinyl pyrrolidone (NVP):

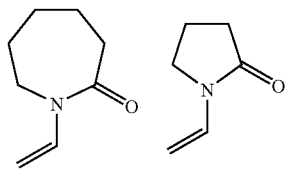

with NVC being particularly preferred.

Similarly, N-acryloyl amines are also well-known in the art. N-Acryloyl amines also have a vinyl group attached to an amide but via the carbonyl carbon atom and again may be further substituted in an analogous manner to the (meth) acrylate monomers. Regarding the nomenclature, since the term "acryloyl" incorporates a carbonyl group, the amide is actually named as an amine.

A preferred example is N-acryloylmorpholine (ACMO):

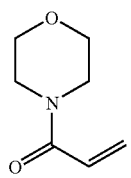

Monofunctional (meth)acrylate monomers are also well known in the art and are the esters of acrylic or methacrylic acid. It has been found that careful selection of the alcohol moiety of the ester may be used to provide an improved ink formulation. In particular, it has been found that a combination of a cyclic monofunctional (meth)acrylate monomer and an acyclic-hydrocarbon (meth)acrylate monomer provides a balance between hardness and flexibility in the cured film. In addition, the inclusion of an acyclic-hydrocarbon (meth) acrylate monomer has surprisingly been found to widen the cure window during the printing process allowing higher power curing without leading to embrittlement of the cured film.

The cyclic monofunctional (meth)acrylate monomer is composed of an ester of acrylic or methacrylic acid in which the alcohol moiety is cyclic, i.e. the radical covalently bonded to the oxygen atom of the (meth)acrylate unit is cyclic. The cyclic radical may be saturated or unsaturated, including aromatic. The substituents are typically cycloalkyl, aryl and combinations thereof, any of which may be interrupted by heteroatoms. Non-limiting examples of substituents commonly used in the art include $C_{3-18}$ cycloalkyl, $C_{6-10}$ aryl and combinations thereof, such as $C_{6-10}$ aryl- or $C_{3-18}$ cycloalkyl-substituted $C_{1-18}$ alkyl, any of which may be interrupted by 1-10 heteroatoms, such as oxygen or nitrogen, with nitrogen further substituted by any of the above described substituents. Preferred cyclic monofunctional (meth)acrylates include:

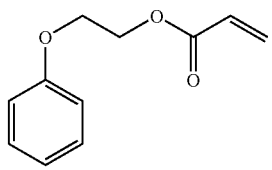

Phenoxyethyl acrylate (PEA)
mol wt 192

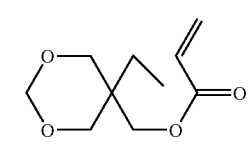

Cyclic TMP formal acrylate (CTFA)
mol wt 200

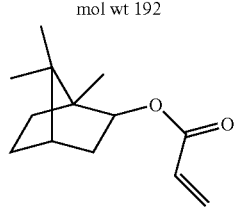

Isobornyl acrylate (IBOA)
mol wt 208

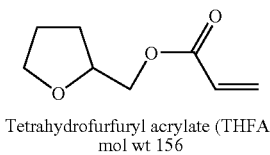

Tetrahydrofurfuryl acrylate (THFA)
mol wt 156

The acyclic-hydrocarbon monofunctional (meth)acrylate monomer is composed of an ester of acrylic or methacrylic acid in which the alcohol moiety is an acyclic hydrocarbon, i.e. the radical covalently bonded to the (meth)acrylate unit is an acyclic hydrocarbon. The acyclic-hydrocarbon radical may be saturated or unsaturated, but saturated is preferred, and the hydrocarbon radical contains no heteroatoms. The acyclic-hydrocarbon radical is therefore preferably a linear or branched acyclic alkyl group, and preferably a linear alkyl group. In both cases, the alkyl group is preferably a $C_{6-20}$ alkyl group, and more preferably a $C_{8-13}$ alkyl group. Preferred acyclic-hydrocarbon monofunctional (meth)acrylates include:

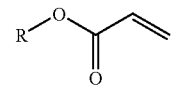

$R = C_8H_{17}/C_{10}H_{21}$
Octadecyl acrylate (ODA), mol wt 200

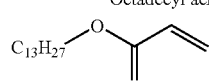     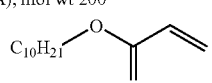

Tridecyl acrylate (TDA), mol wt 254     Isodecyl acrylate (IDA), mol wt 212

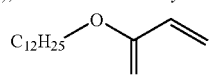

Lauryl acrylate, mol wt 240

The substituents of the monofunctional monomers are not further limited other than by the constraints imposed by the use in an ink-jet ink, such as viscosity, stability, toxicity etc.

The total amount of the at least two monofunctional (meth)acrylate monomers and the at least one monomer selected from an N-vinyl amide, an N-acryloyl amine, or a mixture thereof in combination is preferably from 55 to 85 wt % and most preferably from 65 to 75 wt % based on the total weight of the ink.

The total amount of the at least one monomer selected from an N-vinyl amide, an N-acryloyl amine, or a mixture thereof is preferably from 15 to 40 wt % and more preferably from 20 to 35 wt %, %, based on the total weight of the ink.

The total amount of the cyclic monofunctional (meth)acrylate monomer(s) is preferably from 15 to 70 wt %, more preferably from 25 to 60 wt % and most preferably from 30 to 50 wt %, based on the total weight of the ink.

The total amount of the acyclic-hydrocarbon monofunctional (meth)acrylate monomer(s) is preferably from 3 to 25 wt %, more preferably from 5 to 20 wt % and most preferably from 10 to 20 wt %, based on the total weight of the ink.

The weight ratio of the total amount of the cyclic monofunctional (meth)acrylate monomer(s) to the total amount of the acyclic-hydrocarbon monofunctional (meth)acrylate monomer(s) is preferably from 15:1 to 2:1 and most preferably from 10:1 to 5:1.

The ink also contains a polymerisable (i.e. curable) (meth)acrylate oligomer. The term "polymerisable oligomer" has its standard meaning in the art, namely that the component is partially reacted to form a pre-polymer having a plurality of repeating monomer units which is capable of further polymerisation. The oligomer is preferably a curable, e.g. UV-curable, (meth)acrylate. The oligomer preferably has a molecular weight of at least 450. The molecular weigh is preferably 4,000 or less, more preferably from 2,000 or less and most preferably 1500 or less. The degree of functionality of the oligomer determines the degree of crosslinking and hence the properties of the cured ink. The oligomer is multifunctional meaning that it contains more than one reactive functional group per molecule. The degree of functionality is preferably from 2 to 6.

UV-curable oligomers of this type are well known in the art. The oligomer is preferably based on bisphenol A, a polyester, a polyether, an amine-modified polyester, an amine-modified polyethers or a urethane. Preferred examples are: Sartomer SR601 E which is a bisphenol A ethoxylated (4) diacrylate having a molecular weight of approximately 512, Agisyn AG2881 which is an equivalent product from AGI, CN292 which is a tetrafunctional polyester acrylate having a molecular weight of approximately 950, Sartomer SR349 which is a bisphenol A ethoxylated (3) diacrylate having a molecular weight of approximately 468; and Eternal EC6410 which is an amine-modified polyether acrylate with 2.5 acrylate functionality.

The total amount of the polymerisable (meth)acrylate oligomer(s) is preferably from 5 to 40 wt %, more preferably from 10 to 30 wt %, and most preferably from 15 to 25 wt %, based on the total weight of the ink.

Monomers may be distinguished from the oligomers on account of the lack of repeat units. The monomers typically have a molecular weight of less than 450 and more often less than 300.

The ink of the present invention is based on a carefully selected combination of curable monomers together with a curable multifunctional acrylate oligomer. The combination provides flexibility to the cured film without brittleness and without compromising cure speed and viscosity. The ink should not contain multifunctional monomers which would lead to undesirable brittleness in the cured film and hence the ink of the present invention is substantially free of multifunctional monomer, meaning that only minor or trace amounts will be present, for example as impurities in the monofunctional material or as a component in a commercially available pigment dispersion. The term multifunctional monomers is intended to mean a diluent material with a functionality of two or higher and typically having a viscosity of less than 2 mPas at 25° C. and a molecular weight of less than 450. Multifunctional monomers includes, inter alia, multifunctional (meth)acrylates and multifunctional vinyl ethers.

In addition to the components described above, the compositions include a photoinitiator, which, under irradiation by, for example, ultraviolet light, initiates the polymerisation of the monomers. Preferred are photoinitiators which produce free radicals on irradiation (free radical photoinitiators) such as, for example, benzophenone, 1-hydroxycyclohexyl phenyl ketone, 2-benzyl-2-dimethylamino-(4-morpholinophenyl)butan-1-one, benzil dimethylketal, bis(2,6-dimethylbenzoyl)-2,4,4-trimethylpentylphosphine oxide or mixtures thereof. Such photoinitiators are known and commercially available such as, for example, under the trade names Irgacure, Darocur (from Ciba) and Lucerin (from BASF).

Preferably the photoinitiator is present from 1 to 20% by weight, preferably from 4 to 10% by weight, based on the total weight of the ink.

The wavelength of the radiation and the nature of the photoinitiator system used must of course coincide. The ink is cured by irradiation with actinic radiation, such as UV, x-ray, electron beam etc, although UV-curing is preferred.

The ink jet ink of the present invention also includes a colouring agent, which may be either dissolved or dispersed in the liquid medium of the ink. Preferably the colouring agent is a dispersible pigment, of the types known in the art and commercially available such as, for example, under the trade-names Paliotol (available from BASF plc), Cinquasia, Irgalite (both available from Ciba Speciality Chemicals) and Hostaperm (available from Clariant UK). The pigment may be of any desired colour such as, for example, Pigment Yellow 13, Pigment Yellow 83, Pigment Red 9, Pigment Red 184, Pigment Blue 15:3, Pigment Green 7, Pigment Violet 19, Pigment Black 7. Especially useful are black and the colours required for trichromatic process printing. Mixtures of pigments may be used.

The total proportion of pigment present is preferably from 0.5 to 15% by weight, more preferably from 1 to 5% by weight, based on the total weight of the ink.

Although the ink of the present invention cures by a free radical mechanism, the ink of the present invention may also be a so-called "hybrid" ink which cures by a radical and cationic mechanism. The ink-jet ink of the present invention, in one embodiment, therefore further comprises at least one cationically curable monomer, such as a vinyl ether, and at least one cationic photoinitiator, such as an iodonium or sulfonium salt, e.g. diphenyliodonium fluoride and triphenylsulfonium hexafluophosphate. Suitable cationic photoinitiators include the Union Carbide UV1-69-series, Deuteron UV 1240 and IJY2257, Ciba Irgacure 250 and CGI 552, IGM-C440, Rhodia 2047 and UV9380c.

Other components of types known in the art may be present in the ink to improve the properties or performance. These components may be, for example, surfactants, defoamers, dispersants, synergists for the photoinitiator, stabilisers against deterioration by heat or light, reodorants, flow or slip aids, biocides and identifying tracers.

The present invention also provides a method of ink-jet printing using the above-described ink and a substrate having the cured ink thereon. Suitable substrates include Polystyrene, PolyCarb (a polycarbonate), BannerPVC (a PVC) and VIVAK (a polyethylene terephthalate glycol modified). The ink of the present invention is preferably cured by ultraviolet irradiation and is suitable for application by ink-jet printing.

The ink jet ink exhibits a desirable low viscosity, i.e. less than 100 mPas, preferably less than 50 mPas and most preferably less than 25 mPas at 25° C. Viscosity may be determined using a Brookfield RV6 running at 5 rpm (Meth)acrylate is intended herein to have its standard meaning, i.e. acrylate and/or methacrylate. Mono and multifunctional are also intended to have their standard meanings, i.e. one and two or more groups, respectively, which take part in the polymerisation reaction on curing.

The inks of the invention may be prepared by known methods such as, for example, stirring with a high-speed water-cooled stirrer, or milling on a horizontal bead-mill.

EXAMPLES

The invention will now be described, by way of example, with reference to the following example (parts given are by weight).

Example 1

An ink (ink 1) was prepared having the following composition:

| Component | Wt % | Function |
|---|---|---|
| N Vinyl caprolactam | 25.8 | Vinyl amide monomer |
| 2 Phenoxy ethylacrylate | 38.77 | Cyclic monofunctional monomer |
| Octyl decyl acrylate | 5.0 | Acyclic-hydrocarbon monofunctional monomer |
| Cyan pigment dispersion | 4.53 | |
| UV stabiliser | 0.8 | |
| Irgacure 2959 | 2.0 | Photoinitiator |
| Irgacure 819 | 4.0 | Photoinitiator |
| Irgacure 369 | 1.0 | Photoinitiator |

-continued

| Component | Wt % | Function |
|---|---|---|
| BYK 307 | 0.1 | Surfactant |
| Sartomer SR601E | 18.0 | Difunctional acrylate oligomer |
| Total | 100.0 | |

A comparative ink (ink 2) was also prepared having the same composition but excluding the octyl decyl acrylate monomer (the acyclic-hydrocarbon monofunctional monomer).

Example 2

Inks 1 and 2 were measured for initial viscosity, filter time and particle size by Malvern Analyser and microscope before being subjected to the following tests:
a. Cure Speed. Each ink sample was coated onto 220 micron semi-rigid PVC using a K2 (red) bar and evaluated for cure speed by noting the belt speed required to form a non-tack free surface using 2×80 W/cm lamps on half power.
b. Blocking. Each ink sample was coated onto 220 micron semi-rigid PVC using a K2 (red) bar and cured at 15 m/min, 2×80 W/cm lamps on full power. Coatings of 1, 2 and 3 layers were blocked both face to face and face to back under a 20 Kg weight for 24 hours before assessing degree of blocking.
c. Substrate embrittlement. Each ink sample was coated onto 220 micron semi-rigid PVC using a K2 (red) bar and cured at 15 m/min, 2×80 W/cm lamps on full power. Coatings of 1, 2 and 3 layers were evaluated after 24 hours for ability not to shatter when rolled up (print side out) and hit onto a hard object.
d. Instron elongation. Each ink sample was coated using a K2 (red) bar onto self adhesive PVC and cured at 15 m/min, 2×80 W/cm lamps on full power. The resulting drawdowns were then evaluated after 24 hours on an Instron tensiometer for extension ability and banding/adhesion. Samples were repeated three times and compared to plain uncured and plain cured substrate.
e. Adhesion Each ink sample was coated onto 700 micron PVC, gloss styrene, matt styrene, PETG, polycarbonate and polypropylene using a K2 (red) bar and cured at 15 m/min, 2×80 W/cm lamps on full power. Each coating was then evaluated after 24 hours for scratch adhesion, scratch adhesion from a score and crosshatch/tape adhesion.

The results achieved are set out in the following table in which "5" represents excellent, "1" represents poor, "F-F" represents face-to-face, "F-B" represents face-to-back and "x1", "x2" and "x3" represent 1 layer, 2 layers and 3 layers, respectively.

The cure performance was further assessed by printing an image on an Inca Columbia Turbo flatbed UV ink-jet machine, Substrate 200 micron gloss PVC printed at 5 pass, 1049 mm/sec, 200% coverage and curing at 4, 6, 8, 10 and 12 amps.

When cured at low power (4-6 amps) without the acyclic-hydrocarbon monofunctional monomer the ink has good film properties (i.e. adhesion and flexibility), but when cured at higher power settings (10-12 amps) the cured print became brittle. When the acyclic-hydrocarbon monofunctional monomer is included, the print can be cured anywhere from 4 to 12 amps without embrittlement occurring. Surprisingly the acyclic-hydrocarbon monofunctional monomer, which forms rather soft polymers, does not appear to have a significant negative effect on the film hardness, adhesion or cure speed.

The results (prints checked 24 hours after curing) are set out in the following table n which "5" represents excellent flexibility, no breaking of the ink film or substrate; "3" represents fair flexibility, some cracking of the substrate; and "1" represents very poor flexibility, print shatters badly.

| | Example 1 | | Example 2 | |
|---|---|---|---|---|
| Lamp power | Cure | Flexibility | Cure | Flexibility |
| 4 Amps | Good | 5 | Good | 5 |
| 6 Amps | Excellent | 5 | Excellent | 5 |
| 8 Amps | Excellent | 5 | Excellent | 5 |
| 10 Amps | Excellent | 5 | Excellent | 4 |
| 12 Amps | Excellent | 5 | Excellent | 3 |

Example 3

Ink 1 contains 5% of the acyclic-hydrocarbon monofunctional (meth)acrylate monomer. The following inks were prepared in order to investigate further the amounts of acyclic-hydrocarbon monofunctional (meth)acrylate (ink 1 in the table is the ink prepared according to Example 1):

| Ink | Cure Speed (m/min) | Blocking F-F | Blocking F-B | Embrittlement x1 | Embrittlement x2 | Embrittlement x3 | 100% Instron Elongation Banding | Adhesion - scratch (tape) 700 mic PVC | Gloss Styrene | Matt Styrene | PETG | Poly-carbonate | PP |
|---|---|---|---|---|---|---|---|---|---|---|---|---|---|
| 1 | 30 | 5 | 3 | 5 | 5 | 5 | 5 | 4 (3) | 4 (1) | 5 (5) | 4 (5) | 5 (5) | 1 (1) |
| 2 | 30 | 5 | 3 | 5 | 5 | 5 | 5 | 4 (3) | 4 (3) | 4 (5) | 5 (5) | 4 (5) | 1 (1) |

|  | Amount (wt %) | | | | | | |
| --- | --- | --- | --- | --- | --- | --- | --- |
| Component | Ink 3 | Ink 4 | Ink 5 | Ink 1 | Ink 6 | Ink 7 | Ink 8 |
| N vinyl caprolactam | 25.8 | 25.8 | 25.8 | 25.8 | 25.8 | 25.8 | 25.8 |
| 2 Phenoxyethyl acrylate | 23.77 | 28.77 | 33.77 | 38.77 | 23.77 | 28.77 | 33.77 |
| Octyl Decyl acrylate | 20.0 | 15.0 | 10.0 | 5.0 | — | — | — |
| Tridecyl acrylate | — | — | — | — | 20.0 | 15.0 | 10.0 |
| Cyan pigment dispersion | 4.53 | 4.53 | 4.53 | 4.53 | 4.53 | 4.53 | 4.53 |
| UV stablizer (ST1) | 0.8 | 0.8 | 0.8 | 0.8 | 0.8 | 0.8 | 0.8 |
| Irgacure 2959 | 2.0 | 2.0 | 2.0 | 2.0 | 2.0 | 2.0 | 2.0 |
| Irgacure 819 | 4.0 | 4.0 | 4.0 | 4.0 | 4.0 | 4.0 | 4.0 |
| Irgacure 369 | 1.0 | 1.0 | 1.0 | 1.0 | 1.0 | 1.0 | 1.0 |
| BYK 307 | 0.1 | 0.1 | 0.1 | 0.1 | 0.1 | 0.1 | 0.1 |
| Sartomer SR601E | 18.0 | 18.0 | 18.0 | 18.0 | 18.0 | 18.0 | 18.0 |
| Total | 100 | 100 | 100 | 100 | 100 | 100 | 100 |
| Viscosity (mPas) | 13.9 | 15.8 | 17.5 | 20.6 | 19.1 | 20.3 | 21.0 |

Each of the inks above was tested for cure speed. Each sample was drawn down on to 220 micron gloss PVC using a no. 2 K bar (12 microns). Cure speed was assessed as the point at which a tack-free film was produced. A drier fitted with 1×80 W/cm lamp was used. The results are set out in the following table:

|  | Acyclic hydrocarbon monomer | | |
| --- | --- | --- | --- |
| Ink no | Type | Amount (wt %) | Cure speed* (m/min) |
| 3 | ODA | 20 | 30 |
| 4 | ODA | 15 | 40 |
| 5 | ODA | 10 | 45 |
| 1 | ODA | 5 | 45 |
| 6 | TDA | 20 | 40 |
| 7 | TDA | 15 | 50 |
| 8 | TDA | 10 | 50 |

*Tack-free film - one lamp on full power

As can be seen from the above table, levels of the acyclic hydrocarbon (meth)acrylate monofunctional monomer above 15% begin to have a negative effect on cure speed. However, even the slowest cure speed, 30 m/min is still preferable when compared to prior art formulations.

Embrittlement resistance was also measured: prints were drawn down onto 220 micron gloss PVC using a 12 micron K bar. Samples with 1, 2 and 3 layers of each sample were prepared for evaluation. Each layer was cured at 15 m/min on a UV drier fitted with 2×80 W/cm medium-pressure mercury UV lamps. Each test was repeated three times. A rating of "5" represented no damage and "1" represented severe substrate shattering. Prints were evaluated after 24 hours.

| Ink | No. layers | Monomer type and amount | Test no. 1 | 2 | 3 | Cumulative score |
| --- | --- | --- | --- | --- | --- | --- |
| 1 | x1 | ODA | 5 | 5 | 5 | 42 |
|  | x2 | 5% | 5 | 5 | 5 |  |
|  | x3 |  | 3 | 5 | 4 |  |
| 5 | x1 | ODA | 5 | 5 | 5 | 43 |
|  | x2 | 10% | 5 | 5 | 5 |  |
|  | x3 |  | 3 | 5 | 5 |  |

-continued

| Ink | No. layers | Monomer type and amount | Test no. 1 | 2 | 3 | Cumulative score |
| --- | --- | --- | --- | --- | --- | --- |
| 7 | x1 | TDA | 5 | 5 | 5 | 44 |
|  | x2 | 15% | 5 | 5 | 5 |  |
|  | x3 |  | 5 | 5 | 4 |  |
| 6 | x1 | TDA | 5 | 5 | 5 | 45 |
|  | x2 | 20% | 5 | 5 | 5 |  |
|  | x3 |  | 5 | 5 | 5 |  |
| 3 | x1 | ODA | 5 | 5 | 5 | 45 |
|  | x2 | 20% | 5 | 5 | 5 |  |
|  | x3 |  | 5 | 5 | 5 |  |
| 8 | x1 | TDA | 5 | 5 | 5 | 45 |
|  | x2 | 10% | 5 | 5 | 5 |  |
|  | x3 |  | 5 | 5 | 5 |  |
| 4 | x1 | ODA | 5 | 5 | 5 | 45 |
|  | x2 | 15% | 5 | 5 | 5 |  |
|  | x3 |  | 5 | 5 | 5 |  |

From the above results, the preferred amount of acyclic-hydrocarbon monofunctional (meth)acrylate monomer to achieve near-perfect embrittlement resistance is about 15 wt %. This also ties in well with the amount of acyclic-hydrocarbon monofunctional (meth)acrylate monomer required to maintain the appropriate cure speed.

The inks containing the largest amount of acyclic-hydrocarbon monofunctional (meth)acrylate monomer (inks 3 and 6) were further evaluated for adhesion range and block resistance. Print samples for both of these inks were prepared by drawing down onto the target substrate using a 12 micron K bar and curing with a UV drier fitted with 2×80 W/cm medium-pressure mercury lamps having a belt speed of 15 m/min. A 220 micron gloss PVC substrate was used for the block testing. The results are shown in the following table:

|  | Ink no. | | | | | | | | |
| --- | --- | --- | --- | --- | --- | --- | --- | --- | --- |
|  | 1 | | | 3 | | | 6 | | |
| Substrate | Nail | Tape | Scratch from Score | Nail | Tape | Scratch from Score | Nail | Tape | Scratch from Score |
| 700 mic PVC | 5 | 5 | 5 | 5 | 5 | 5 | 5 | 5 | 5 |
| Styrene Gloss | 5 | 5 | 4 | 5 | 5 | 4 | 5 | 5 | 5 |
| Styrene Matt | 5 | 5 | 5 | 5 | 5 | 5 | 5 | 5 | 5 |
| Vivak (PETG) | 5 | 5 | 5 | 5 | 5 | 5 | 5 | 5 | 5 |
| Polycarbonate | 5 | 5 | 5 | 5 | 5 | 5 | 5 | 2 | 2 |
| Correx (PP) | 4 | 1 | 4 | 4 | 1 | 4 | 4 | 1 | 4 |
| Acrylic | 5 | 1 | 2 | 5 | 1 | 2 | 5 | 1 | 2 |

From these results, it is apparent that higher amounts of acyclic-hydrocarbon monofunctional (meth)acrylate monomer do not have a significant effect on the adhesion range.

For each ink, samples having 1, 2 and 3 layers were prepared and blocking was assessed by placing the prepared prints ink-to-ink (face-to-face) and ink-to-substrate (face-to-back) under a 20 Kg weight for 24 hours. A score of "5" represents no blocking or marking and "1" represents severe blocking and offsetting of the ink film.

| Ink | No. layers | Face-to-face | Face-to-back |
| --- | --- | --- | --- |
| 1 | x1 | 5 | 4 |
|  | x2 | 5 | 4 |
|  | x3 | 5 | 4 |
| 6 | x1 | 4 | 4 |
|  | x2 | 4 | 4 |
|  | x3 | 5 | 4 |
| 3 | x1 | 4 | 4 |
|  | x2 | 4 | 4 |
|  | x3 | 5 | 4 |

No significant effects on blocking resistance were evident when the results even with higher levels of TDA and ODA.

The optimum level for the acyclic-hydrocarbon (meth) acrylate monofunctional monomer in is 15%. At this level, maximum embrittlement resistance is achieved without compromising the cure speed, block resistance or, to any significant extent.

The invention claimed is:

1. A radiation-curable ink-jet ink comprising at least two monofunctional (meth)acrylate monomers; a monofunctional monomer selected from an N-vinyl amide, an N-acryloyl amine, or a mixture thereof; a polymerisable (meth) acrylate oligomer; a radical photoinitiator; and a colouring agent; wherein the ink has a viscosity of less than 100 mPas at 25° C.; wherein the ink is substantially free of water, volatile organic solvents and multifunctional monomers; wherein the polymerisable (meth)acrylate oligomer has a degree of functionality from 2 to 6; and wherein the at least two monofunctional (meth)acrylate monomers include a combination of a cyclic monofunctional (meth)acrylate monomer and an acyclic-hydrocarbon monofunctional (meth)acrylate monomer.

2. An ink-jet ink as claimed in claim 1, wherein the total amount of the at least two monofunctional (meth)acrylate monomers and the at least one monofunctional monomer selected from an N-vinyl amide, an N-acryloyl amine, or a mixture thereof is at least 60 wt % based on the total weight of the ink.

3. An ink-jet ink as claimed in claim 2, wherein the total amount is at least 70wt %.

4. An ink-jet ink as claimed in claim 3, wherein the total amount is at least 80wt %.

5. An ink-jet ink as claimed in claim 1 wherein the total amount of the monomer selected from an N-vinyl amide, an N-acryloyl amine, or a mixture thereof is from 15 to 40 wt % based on the total weight of the ink.

6. An ink-jet ink as claimed in claim 1, wherein the total amount of the cyclic monofunctional (meth)acrylate monomer is from 15 to 70 wt %, based on the total weight of the ink.

7. An ink-jet ink as claimed in claim 1, wherein the total amount of the acyclic-hydrocarbon monofunctional (meth) acrylate monomer is from 3 to 25 wt %, based on the total weight of the ink.

8. An ink-jet ink as claimed in claim 1, wherein the cyclic monofunctional (meth)acrylate monomer is selected from phenoxyethyl acrylate (PEA), cyclic TMP formal acrylate (CTFA), isobornyl acrylate (IBOA), tetrahydrofurfuryl acrylate (THFA), and mixtures thereof.

9. An ink-jet ink as claimed in claim 1, wherein acyclic-hydrocarbon monofunctional (meth)acrylate monomer contains a linear or branched $C_{6-20}$ alkyl group.

10. An ink-jet ink as claimed in claim 9, wherein acyclic-hydrocarbon monofunctional (meth)acrylate monomer is selected from octadecyl acrylate (ODA), tridecyl acrylate (TDA), isodecyl acrylate (IDA), lauryl acrylate and mixtures thereof.

11. An ink-jet ink as claimed in claim 1, wherein the polymerisable (meth)acrylate oligomer has a molecular weight from 450 to 5,000.

12. A method of ink-jet printing, comprising printing the ink-jet ink as claimed in any preceding claim 1 on to a substrate and curing the ink.

13. A substrate having the ink-jet ink as claimed in claim 1 printed thereon.

14. A method of ink-jet printing, comprising printing the ink-jet ink as claimed in claim 2 on to a substrate and curing the ink.

15. A method of ink-jet printing, comprising printing the ink-jet ink as claimed in claim 3 on to a substrate and curing the ink.

16. A method of ink-jet printing, comprising printing the ink-jet ink as claimed in claim 4 on to a substrate and curing the ink.

17. A method of ink-jet printing, comprising printing the ink-jet ink as claimed in claim 5 on to a substrate and curing the ink.

18. A method of ink-jet printing, comprising printing the ink-jet ink as claimed in claim 6 on to a substrate and curing the ink.

19. A method of ink-jet printing, comprising printing the ink-jet ink as claimed in claim 7 on to a substrate and curing the ink.

\* \* \* \* \*